United States Patent
Campbell

Patent Number: 6,099,091
Date of Patent: Aug. 8, 2000

[54] TRACTION ENHANCED WHEEL APPARATUS

[75] Inventor: Sanford F. Campbell, Redding, Calif.

[73] Assignee: Letro Products, Inc., Redding, Calif.

[21] Appl. No.: 09/009,575

[22] Filed: Jan. 20, 1998

[51] Int. Cl.[7] .................................................. B60B 15/18
[52] U.S. Cl. ......................... 305/4; 180/164; 152/209.17
[58] Field of Search ................... 305/4, 5, 60; 180/164; 152/209.17; D12/139; 301/39.1, 40.1

[56] References Cited

U.S. PATENT DOCUMENTS

| | | | |
|---|---|---|---|
| 1,400,151 | 12/1921 | Golein | 152/209.17 |
| 1,403,115 | 1/1922 | Golein | 152/209.17 |
| 1,468,439 | 9/1923 | Cozakos | 152/209.17 |
| 2,004,036 | 6/1935 | Coenning | 152/209.17 |
| 3,439,368 | 4/1969 | Myers . | |
| 3,822,754 | 7/1974 | Henkin et al. . | |
| 3,936,899 | 2/1976 | Henkin et al. . | |
| 3,972,339 | 8/1976 | Henkin et al. . | |
| 4,558,479 | 12/1985 | Greskovics et al. . | |
| 4,667,719 | 5/1987 | Masuda | 152/209.17 |
| 4,699,252 | 10/1987 | Sing | 180/164 X |
| 4,920,599 | 5/1990 | Rief . | |
| 5,001,800 | 3/1991 | Parenti et al. . | |
| 5,099,535 | 3/1992 | Chauvier et al. . | |
| 5,603,135 | 2/1997 | Jones et al. . | |

FOREIGN PATENT DOCUMENTS

| | | | |
|---|---|---|---|
| 464 538 | 10/1970 | Australia . | |
| 1357254 | 12/1987 | U.S.S.R. | 305/4 |

Primary Examiner—Russell D. Stormer
Attorney, Agent, or Firm—Fleisler, Dubb, Meyer & Lovejoy LLP

[57] ABSTRACT

A drive wheel, having a cylindrical surface positioned at a radius from the center of the drive wheel, and a plurality of suction cup members disposed in a spaced apart relationship on the cylindrical surface, useful in a pressurized pool cleaning apparatus.

14 Claims, 9 Drawing Sheets

TRACTION ENHANCED WHEEL APPARATUS

BACKGROUND OF THE INVENTION

1. Field of the Invention

The invention relates to an improvement for moving carriages needing increased traction on any number of surfaces, and particularly for a self-propelled pool cleaner transported on a rotating wheel assembly which is required to climb vertical walls of pools which are composed of different surfaces.

2. Description of the Related Art

Swimming pools provide a wide variety of benefits and pleasures. There are countless varieties of swimming pools of widely varying size and design in place in parks, recreational facilities, schools, and homes. However, pools must be regularly maintained to keep the pool clean from dirt, sand and other debris which invariably find their way into the pool.

All manner of debris can be carried or blown into the pool and generally such debris settles to the bottom or onto the walls of the pool, where it will accumulate until removed. A dirty pool is unsightly and unsanitary.

As a consequence, a great deal of effort has been made to automate the task of pool cleaning. Manual pool cleaners, though generally effective for removing debris from a pool, require a human operator for their operation. Generally, one thinks of a manual pool cleaner as a simple tool having a mesh or a net suspended from a frame which is used in order to mainly sweep or skim debris from the pool. Although inexpensive and simple, cleaning a pool with this tool is rather laborious and cumbersome. Another type of manual pool cleaner features a vacuum head mounted at one end of a long pole. The vacuum head draws water and debris from the bottom or sides of the pool in much the same way that a common household vacuum cleaner removes debris from the floors.

In contrast, automatic pool cleaners operate without human supervision. One conventional automatic pool cleaner has a wheeled carriage equipped with a suction tube for drawing debris from the bottom of the pool into a mesh debris bag. This cleaner also has a tubular supply mast projecting upward from a frame inside the wheel carriage to connect a pressurized water feed line that powers the suction tube and moves the cleaner across the bottom and walls of the pool along a more or less random path. The supply mast also has a horizontal projection upon which a ballast float can be mounted to balance the cleaner. As the cleaner moves over the pool bottom, items of debris are picked up and removed from the pool as the suction tube draws water into the device.

Such automatic cleaners are generally referred to as "pressurized" cleaners. One issue with pool cleaners of this type is that the wheeled carriage may have difficulty traversing the vertical or near-vertical walls of pools. Generally the cleaner will travel about the pool floor and sidewalls until an obstruction is reached, or until it reaches the junction or radius of the floor and sidewall. If the junction is a radius, the cleaner tends to climb up the wall until traction is lost and gravity forces the cleaner to the bottom. Pools may be lined with various types of materials, including tile, cement, plaster, vinyl liner, painted concrete or fiberglass. In cases where the floor/sidewall junction is relatively abrupt, the cleaner may not be able to climb up the wall.

Algae growth on the pool lining material worsens the traction problem for a cleaner in a pool. Once algae grows on a tile surface, for example, the walls become extremely slippery, and the automatic pool cleaner has an extremely difficult time in traversing the walls of the pool.

SUMMARY OF THE INVENTION

The invention, roughly described, comprises an apparatus for increasing the ability of a pressurized pool cleaner to traverse the walls of the pool. In one aspect, the apparatus comprises a drive wheel, having a cylindrical surface positioned at a radius from the center of the drive wheel, and a plurality of suction cup members disposed in a spaced apart relationship on the cylindrical surface.

The device is particularly useful in a pool cleaning apparatus which may comprise a frame and suction apparatus for drawing debris from the bottom of the pool into a debris bag, and may comprise the wheel assembly, mounted to the frame, which supports the cleaning apparatus for movement about the bottom of the pool.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION OF THE PREFERRED EMBODIMENTS

Figure 1:
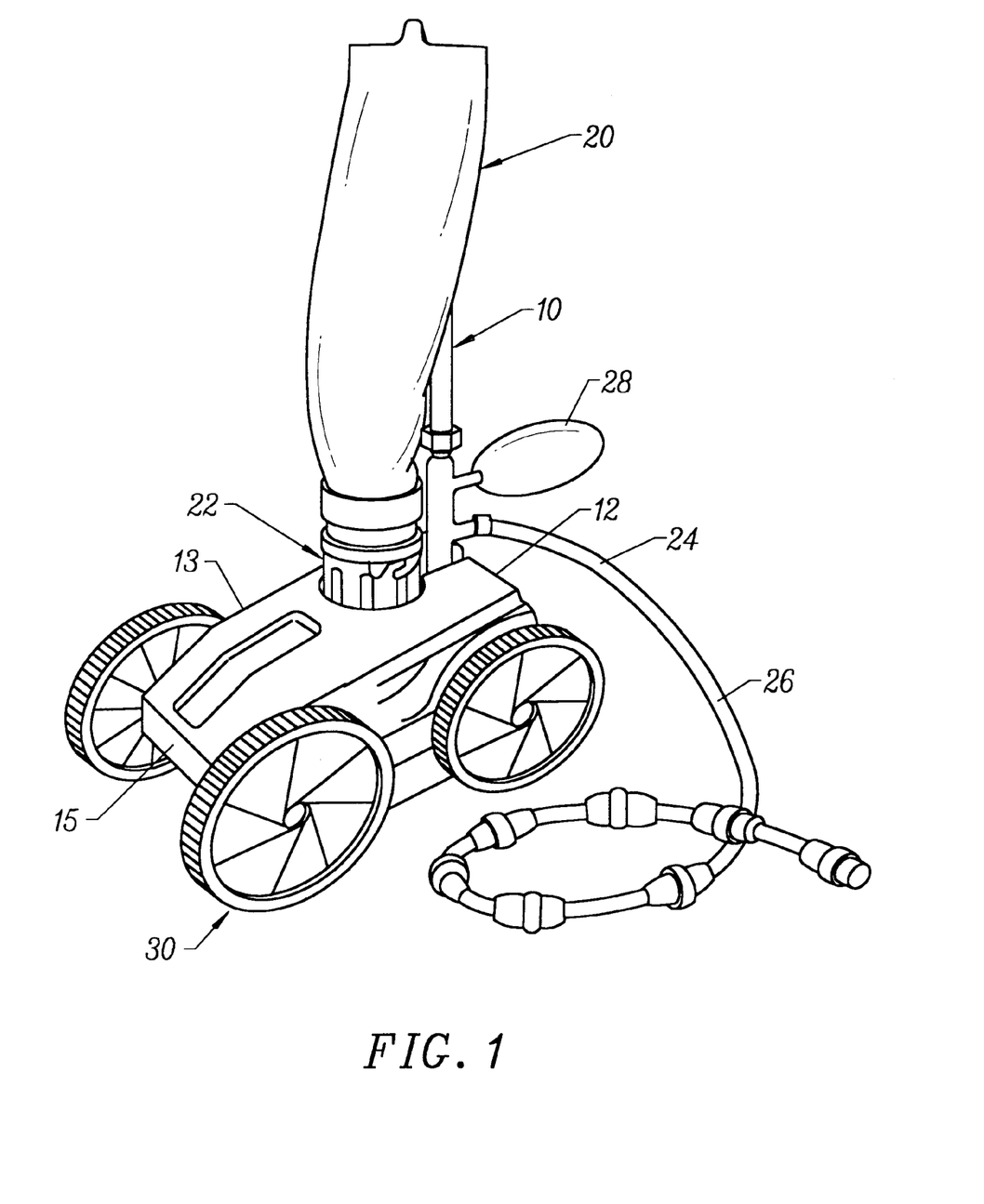
FIG. 1 is a perspective view of a pressurized pool cleaner.

FIG. 1 shows a pressurized, automatic pool cleaning apparatus currently sold by Letro Products, Inc., under the trademark "Legend®." Cleaner 10 includes four drive wheels (further detailed in FIG. 2), a frame assembly 12, which supports a drive mechanism, and a suction assembly utilized to draw debris upward into a debris bag 20 mounted on supply mast 22. The apparatus includes a supply mast 24 which is connected to a water feed line 26 which, though shown disconnected in FIG. 1, is generally connected to the pool's circulation pump, and/or a booster pump, to drive the cleaner when submerged in a pool. A ballast float 28 is secured to the back of support mast 22 to stabilize the cleaner when submerged.

Frame 12 may include an upper body shell 13 and a lower body shell 15.

Some of the pressurized water from feed line 26 is injected upward into the suction tube 22 to create a venturi that sucks debris from under the cleaner into debris bag 20. The pressure through feed line 26 also powers the drive mechanism, which may include a turbine and gears (not shown), positioned in frame 12 to drive the wheel assemblies 30 to move the cleaner 10 around the surface of the pool.

Figure 2:
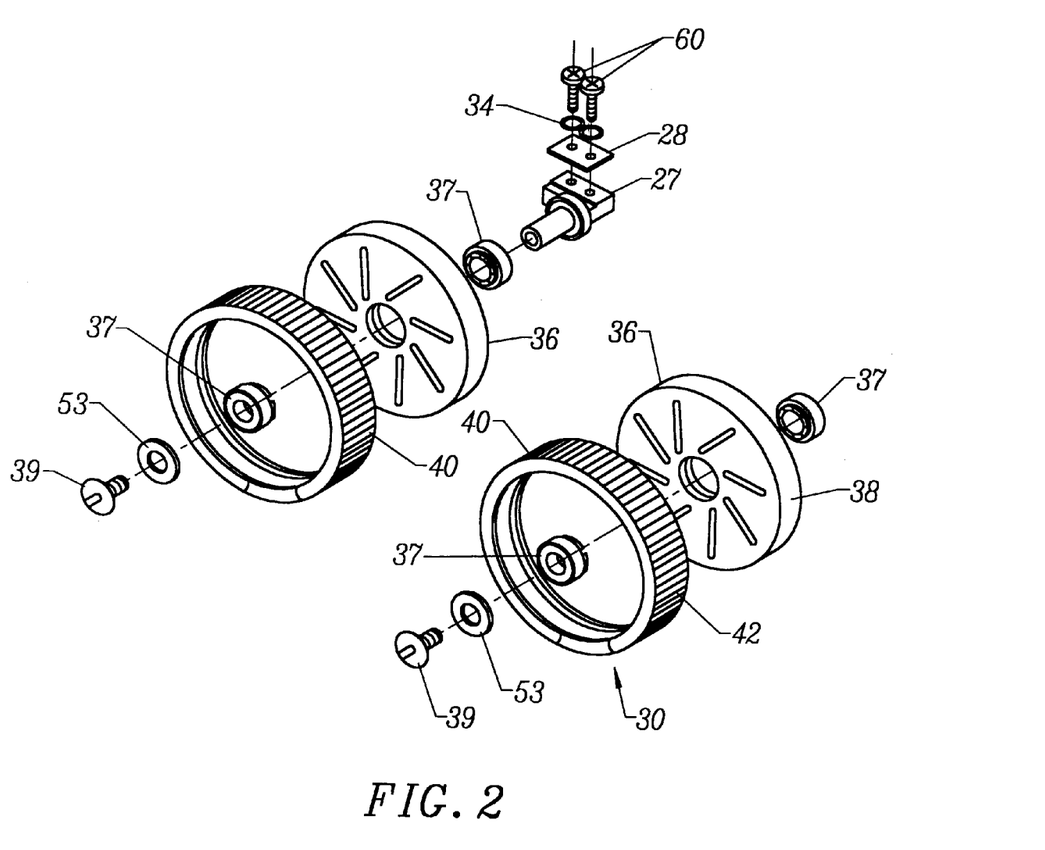
FIG. 2 is a perspective view of the wheel assembly of the pressurized pool cleaner incorporated in FIG. 1.

FIG. 2 is an exploded view of two of the wheel assemblies used in the device shown in FIG. 1. As shown in FIG. 2, each wheel assembly 30 comprises an inner wheel 36 surrounded by an outer tire 40. The inner wheels are mounted on bearings 37, which are themselves mounted to drive axles 27 secured to the frame by axle plates 28, and bolts 60 with lock washers 34. Wheels 36 are secured to bearings 37 by wheel screws 39 and wheel washer 53.

In one embodiment, the outer surface of the outer tire is relatively smooth. In another embodiment, shown in FIG. 2, the outer tire 40 includes ribs 42 which increase the traction of the wheels on the pool lining when the cleaning apparatus is under water.

Figure 3:
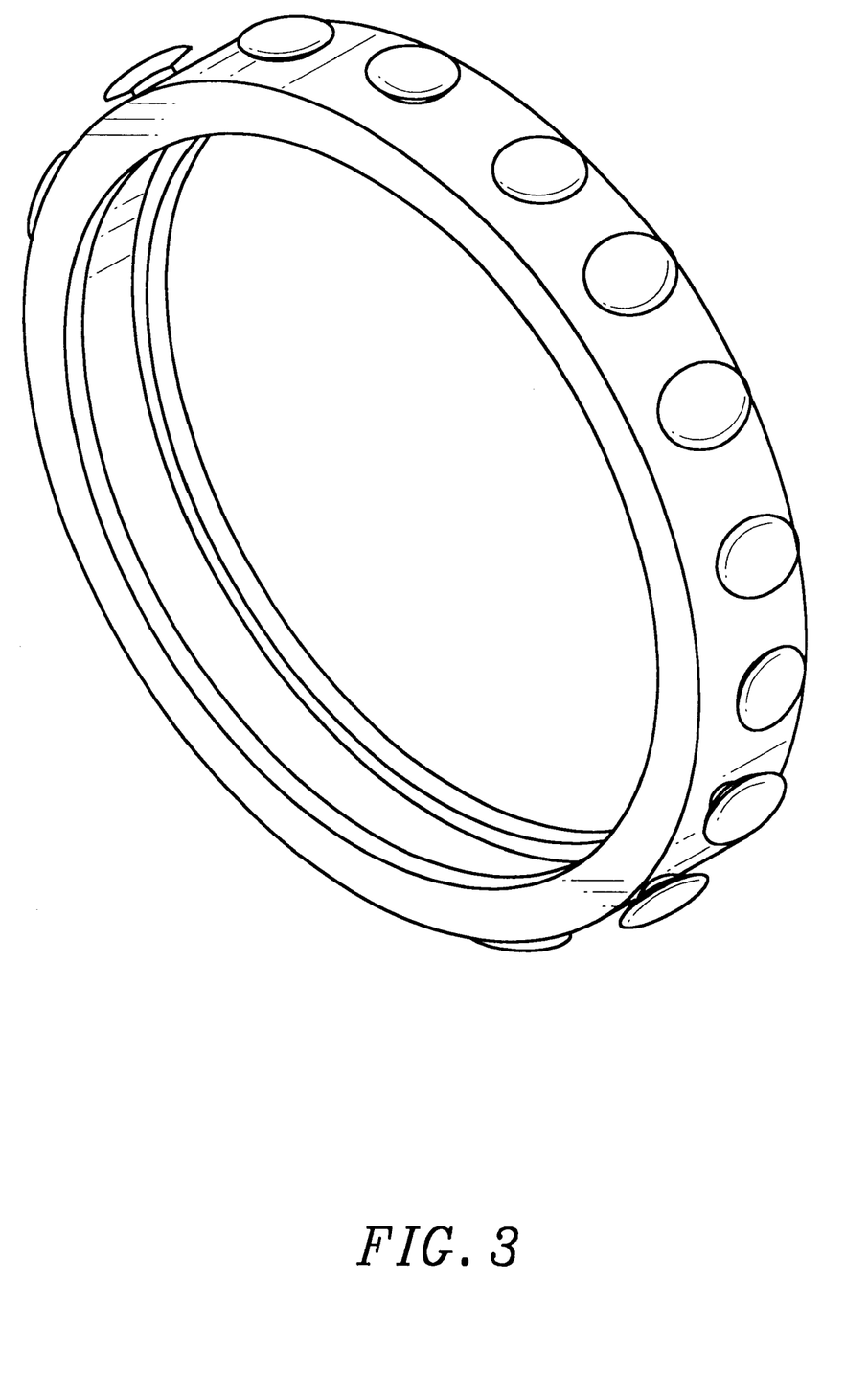
FIG. 3 is a perspective view of a tire assembly in accordance with the present invention.
Figure 4:
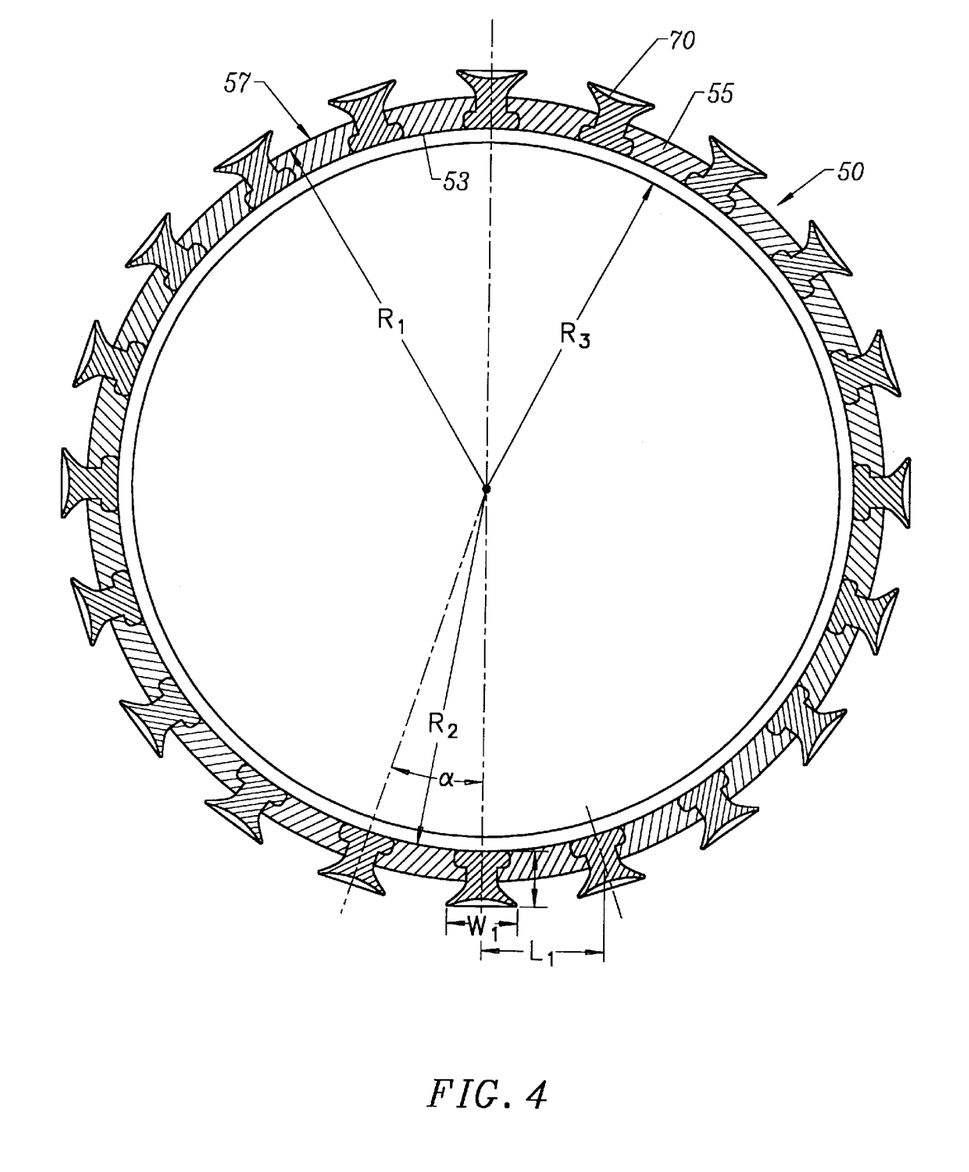
FIG. 4 is a plan view of the tire assembly shown in FIG. 3.
Figure 5:
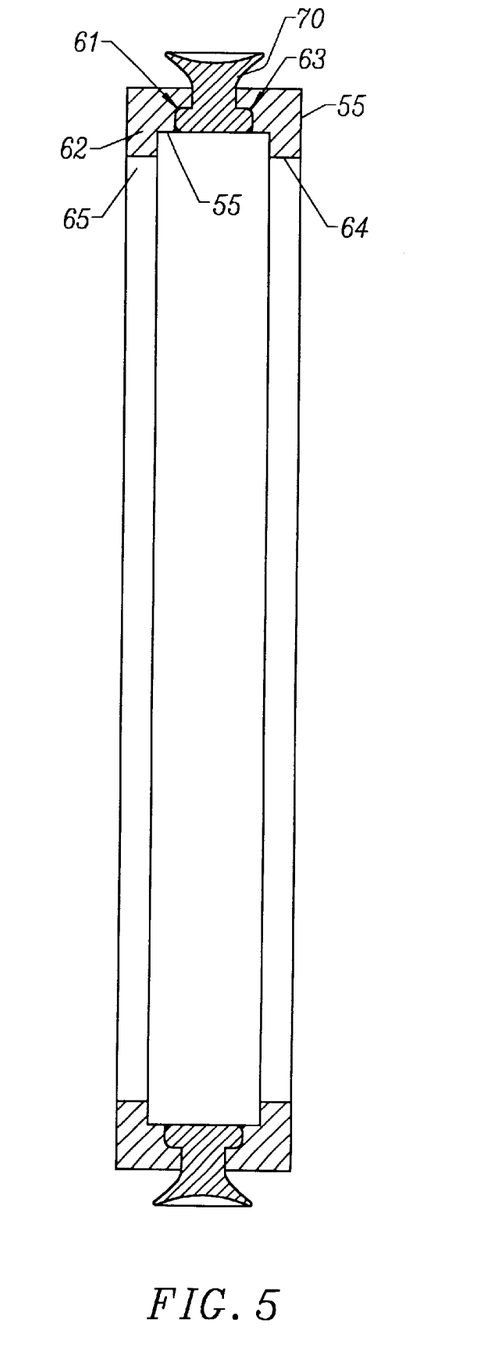
FIG. 5 is an end view of the assembly shown in FIG. 3.

FIGS. 3 through 6 show a first embodiment of the tire assembly of the present invention. As shown in FIGS. 3 through 5, the tire assembly 50 comprises a tire 55 which includes a plurality of through bores 60 in which are secured molded suction members 70. Tire 55 has an outer cylindrical surface 57 which lies at a radius $R_1$ from the rotational center point P of tire 55. An inner surface 53 of tire 55 lying at radius $R_2$ from point P, abuts an outer surface 38 of wheel 36. As shown in cross-section in view in FIG. 5, the second cylindrical surface 53 is bordered by a first and second ledges 62,64 each having an inner surface 65a,65b which lies at a distance ($R_3$) from point P. Surface 53 engages the outer surface of wheel 36, and ledges 62,64 surround wheel 36 to secure tire 55 about wheel 36. It should be recognized that the values of $R_1$, $R_2$ and $R_3$ may vary according to a number of factors, including the load carried, the weight of the cleaner, the size of cleaner and type of pool surface. Hence, the dimensions given herein are exemplary and not intended to limit the scope of the invention. In an exemplary embodiment, $R_1$=3.4575 inches, $R_2$=3.2185 inches and $R_3$=3.0850 inches.

Figure 6A:
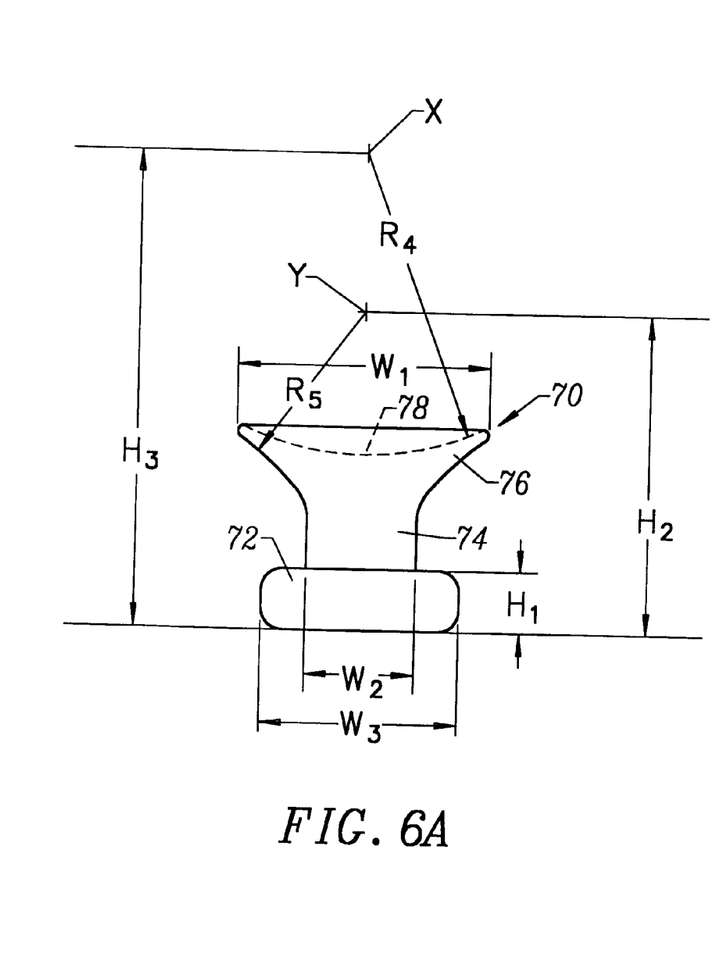
FIGS. 6A, 6B and 6C are plan, cross-section and top views, respectively, of the suction member of the tire assembly shown in FIG. 3.
Figure 6B:
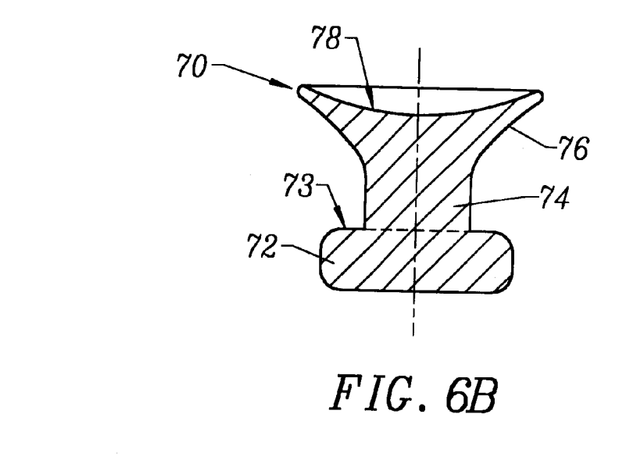
Figure 6C:
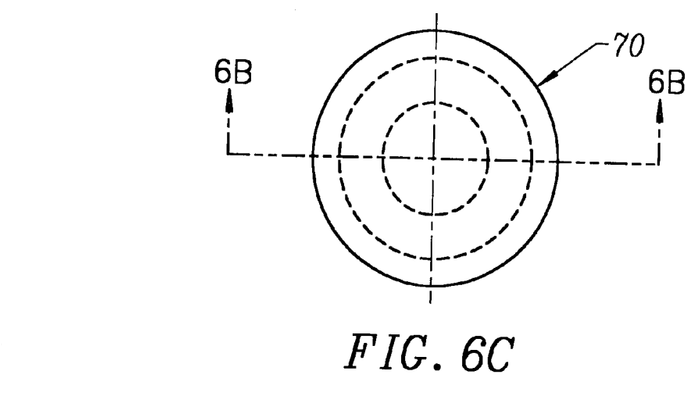

FIGS. 6A, 6B and 6C show an enlarged view and a cross-sectional view of the suction cup member 70. Suction cup member 70 includes a base portion 72 (having a height $H_1$), a stem 74 and a cup 76. In the exemplary embodiment, height $H_1$ is about 0.1250 inch. Cup 76 has an inner surface 78 which is defined by a radius $R_4$ from point X at a height $H_3$ above the base of the member in FIG. 6A. In the exemplary embodiment, radius $R_4$ is approximately 0.7486 inch and $H_3$ is 1.1354 inches. Radius $R_5$ defines the curvature of the back side of cup 78 from point y at height $H_2$ and in the exemplary embodiment, $R_5$ may be about 0.4470 inch and $H_2$ may be about 0.7586 inch. Again, the foregoing dimensions and the particular construction of the cup are exemplary. Any suction member constructed to adhere the wheel to the pool surface will work equally well in the present apparatus. As shown in FIGS. 4 and 5, base 72 of member 70 engages recess 60 so that an upper surface 73 of base 72 engages a lower surface 63 of bore 61.

Tire 55 and suction members 70 are manufactured from, for example, a plastic material such as polyvinyl chloride (PVC) or any other substitute rubber, plastic or pliable material, as are suction members 70. One such material suitable for use in making tire 55 is sold under the trade name Sanapream. In assembly, suction members 70 are inserted through bore 61. Members 70 and tire 55 are injection molded or otherwise manufactured in accordance with known techniques.

It should be recognized that the size of the suction members and the spacing of the members along the wheel determine the amount of attractive force between the wheel and the surface upon which the cleaner is traveling. The amount of force must be sufficient to attract the cleaner to the side wall when the cleaner is climbing a vertical wall, maintain the contact between the suction cup and the side wall, and yet not be so strong as to overpower the rotational torque of the drive wheels, hence disabling motion of the cleaner.

In the exemplary embodiment described herein, where radius $R_1$ is approximately 3.4575", the width $W_1$ (or diameter) of each suction member 70 is approximately 0.6250". In a further aspect, the width $W_2$ of stem 74 is 0.28 inch. Stem width should be sufficient to ensure that the suction force between the cup and the pool surface, and the force of rotation of the wheel, do not shear the stem during rotation. (Notably, bores 61 have a diameter or width equal to that of stem 74.) In general, the design must ensure, at a minimum, that the spacing between the gripping surfaces is such that one suction member is in contact with the surface at all times and that, upon rotation, as one suction cup is engaging the surface of the pool, the other suction member will simultaneously be removed from the surface. In the exemplary embodiment, the suction members are spaced at angle α apart relative to rotation point P. In the exemplary embodiment, a is about 18° and hence spacing between the cup portions of the suction members 70 is approximately 1.634 inches measured at line $L_1$. It should be recognized that the number, size and spacing of the suction members 70 on the wheel may be empirically determined based on given conditions such as motor power, cleaner size, suction desired, etc. to meet any variance in the particular requirements of the cleaner.

Figure 7:
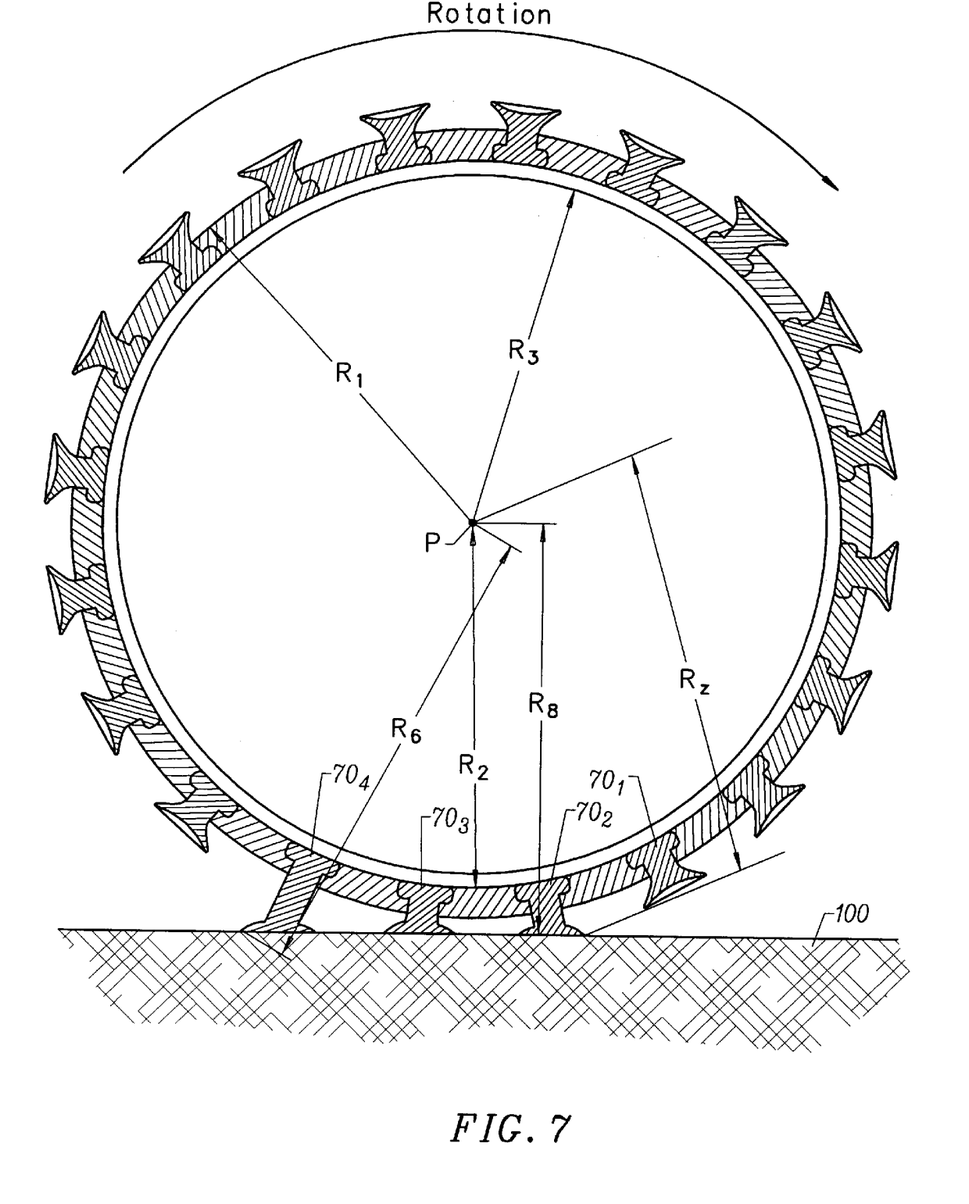
FIG. 7 shows the tire assembly of FIG. 4 in rotation and in contact with a surface 100.
Figure 8:
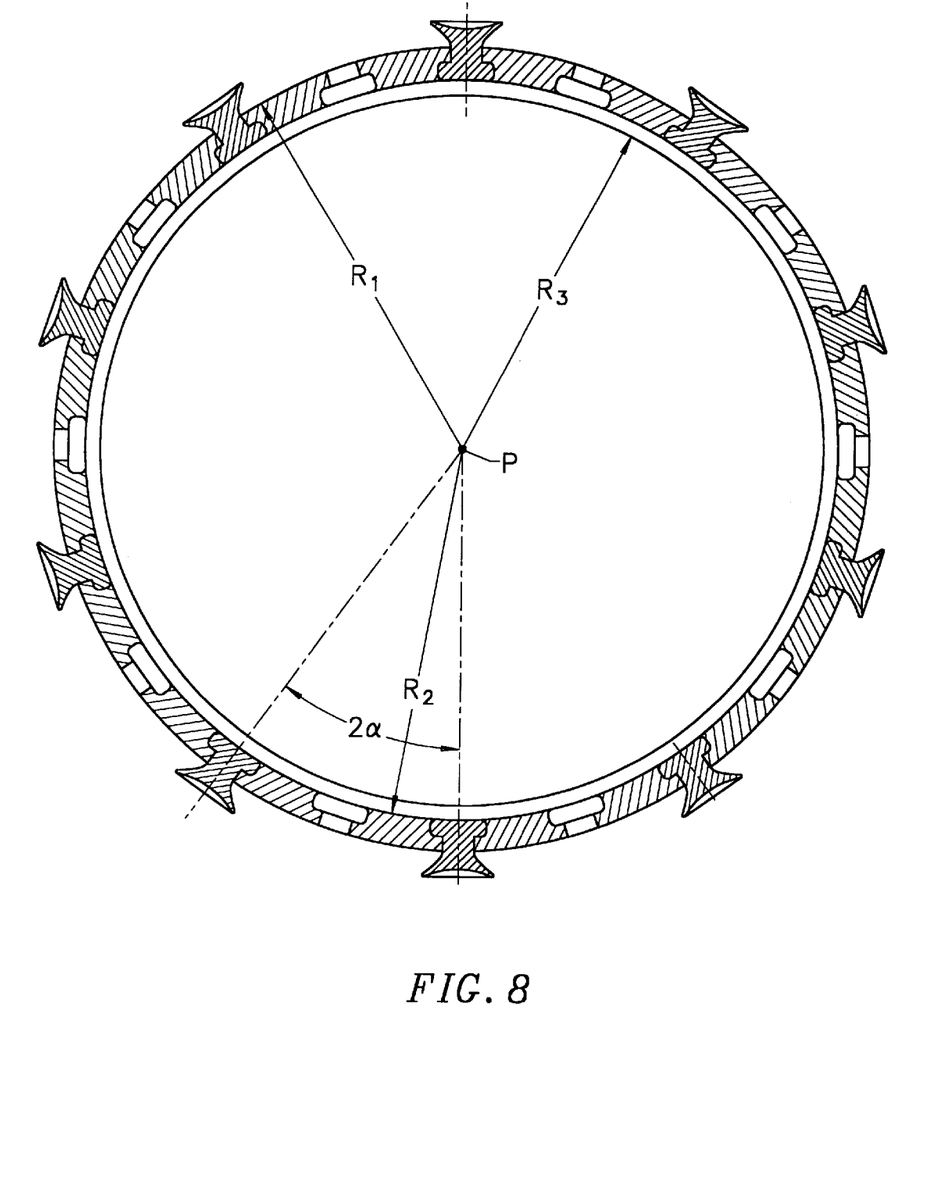
FIG. 8 shows an alternative implementation of the tire assembly of FIG. 4.

FIG. 7 illustrates the rotation of the tire apparatus with dimensions as set forth in the exemplary embodiment showing suction members 70 on a sidewall 100 of a pool surface. As shown therein, a first suction member 71 is rotating into contact with surface 100 while members $70_2$ and $70_3$ are in full contact with surface 100 and member $70_4$ is being drawn away from surface 100. It should be noted that the stem of member 74 is elongated due to the force of the suction cup with respect to the surface 100. In the exemplary embodiment, the distance $R_6$, when member $70_4$ will be disengaged from surface 100, is approximately 4.1430 inches, while the contact distance $R_7$ when member $70_2$ will be fully engaged with the surface 100 is approximately 3.6630 inches.

Under certain conditions, having two suction members (for example, $70_3$ and $70_2$) in full contact with the surface 100 of a pool will provide too much retention force relative to the power of the cleaner. In certain cases, this amount of force could actually be too great to be overcome by the drive apparatus of the pool cleaner. In such cases, it would be possible to maintain the radii $R_1$–$R_3$ distance, and increase the distance between adjacent suction member 70 to 2α (or about 36°) relative to rotational point P. In such an embodiment, suction member $70_2$ and $70_4$ would remain in contact with the surface 100, with the $70_3$ being removed, thereby lessening the attractive force of the wheel with respect to the surface 100. It should be noted that such an embodiment may be implemented by simply leaving out alternating members in a standard wheel; and such an arrangement is shown in FIG. 7. An alternative embodiment is to specifically manufacture the tire assembly to have 36° spacing between adjacent bores and section members.

Figure 9:
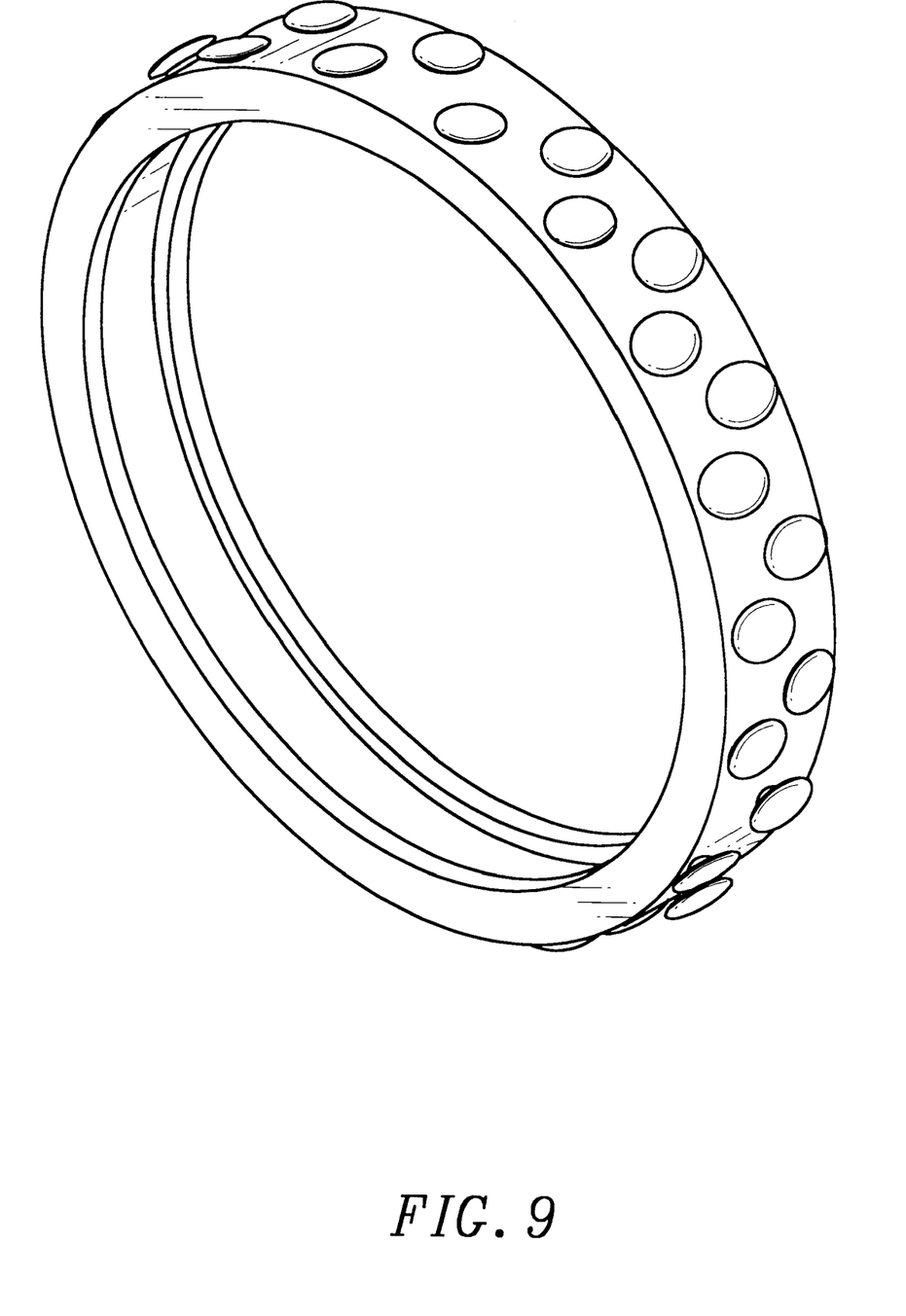
FIG. 9 shows an alternative aspect of the present invention wherein the invention may be incorporated on a roller wheel of an electric cleaner.

Yet another alternative embodiment of the present invention is shown in FIG. 9 wherein two rows of suction members are used, rather than one. The rows are shown in an alternating staggered relationship, but a side-by-side relationship may also be used. Again, alternating ones of the suction members may be removed, or the spacing increased between members, as needed.

It should be recognized that the present invention may be expanded for use with other types of cleaners, such as electric cleaners. Electric cleaners utilize a relatively wide inch) cylindrical roller or track, rather than a wheeled carriage, to propel the cleaner through the pool. The suction members may be placed on the roller of an electric cleaner of a type currently sold by, for example, Aqua Products, Inc. under the trade name "Aquabot" or Maytronics, Ltd. under the trade name "Dolphin" in accordance with the present invention. Again, in each of the alternative embodiments discussed herein, empirical determination of the spacing of the suction members, the number and size of the members, will generally lead to an effective solution for allowing the automated pool cleaner to traverse the walls of a pool where the surfaces are extremely slick.

It should be noted that one critical relationship which is presented in the apparatus of the present invention is that between the surface area of the suction member and the distance $R_8$ between the rotational center point and the surface 100 of the pool. In the exemplary embodiment, $R_8$ is approximately 3.5567 inches, while the area of the suction member $[\Pi r^2=(\Pi(W_1/2)^2)]$ is approximately 0.3068 inch$^2$, and the width (or diameter) ($W_1$) of each suction member at 0.625 inch. This ensures that there is sufficient surface area on the rotational suction members relative to the rotation of the wheel to ensure suction between the tire and surface 100.

The many features and advantages of the present invention will be apparent to one of average skill in the art. Numerous modifications may be made to the apparatus of the present invention while remaining within the scope of the invention and the following claims. For example, the number and size of the suction members, their orientation with respect to the cylindrical surfaces of the wheel and tire, and their spacing on the wheel, may all be varied in accordance with the present invention by empirical means dependent upon the type of cleaning apparatus in which the tire or wheel assembly is intended to be used. Moreover, the assembly may have broader applications in other field where a mechanized apparatus is required to traverse a near-vertical or vertical sidewall on a relatively slippery surface. All such features and advantages, and modifications, are intended to be within the scope of the invention as set forth herein and defined by the following claims.

What is claimed is:

1. An apparatus, comprising:
   a drive wheel, having a first cylindrical surface positioned at a radius from the center of the drive wheel; and
   a plurality of suction members disposed in a spaced apart relationship on the cylindrical surface;
   wherein the drive wheel includes a tire including said first cylindrical surface, the tire including a plurality of through bores in which said suction members are disposed.

2. The apparatus of claim 1 wherein the tire is made of rubber, PVC, or the like.

3. The apparatus of claim 1 wherein the spaced-apart relationship between ones of the plurality of suction members is such that at least one suction member is in contact with a surface with which the drive wheel is in contact at any point in time.

4. The apparatus of claim 1 wherein the tire is mounted about a support wheel having an outer surface, and the tire includes an inner surface, and a first and second ledges bordering the inner surface, the tire being secured about the support wheel such that an outer surface of the support wheel engages the inner surface of the tire.

5. The apparatus of claim 1 wherein the plurality of suction members is disposed in a single row about the cylindrical surface.

6. The apparatus of claim 1 wherein the plurality of suction members is disposed in at least two rows on the cylindrical surface.

7. The apparatus of claim 6 wherein alternating ones of said members in said at least two rows contact a surface upon which the drive wheel is in contact when said drive wheel is rotated.

8. The apparatus of claim 1 wherein each member is spaced apart from adjacent members by an angular distance relative to the rotational center of the drive wheel.

9. The apparatus of claim 8 wherein said angle is in a range of 18°–36°.

10. The apparatus of claim 1 wherein the ratio between the radius, the distance from a point of rotation of the drive wheel to a pool surface, and the width of the suction member, is in a range of 5:1 to 6:1.

11. An apparatus comprising:
    a drive wheel including a first cylindrical surface positioned at a radius from the center of the drive wheel;
    a tire assembly mounted to the drive wheel, the tire assembly including a tire member having a plurality of bores positioned about the tire member; and
    a plurality of suction members positioned on the cylindrical surface and disposed in the bores in the tire member.

12. The apparatus of claim 11 wherein the tire is made of rubber, PVC, or the like.

13. The apparatus of claim 12 wherein the tire is mounted about a support wheel having an outer surface, and the tire includes an inner surface, and a first and second ledges bordering the inner surface, the tire being secured about the support wheel such that an outer surface of the support wheel engages the inner surface of the tire.

14. The apparatus of claim 11 wherein the plurality of suction members is disposed in at least one row about the cylindrical surface.

* * * * *